United States Patent
Burckhardt et al.

(10) Patent No.: US 9,637,668 B2
(45) Date of Patent: May 2, 2017

(54) STRUCTURAL POLYURETHANE ADHESIVE HAVING A LOW GLASS TRANSITION TEMPERATURE

(71) Applicant: SIKA TECHNOLOGY AG, Baar (CH)

(72) Inventors: Urs Burckhardt, Zürich (CH); Steffen Kelch, Oberengstringen (CH); Rita Cannas, Dübendorf (CH)

(73) Assignee: SIKA TECHNOLOGY AG, Baar (CH)

(*) Notice: Subject to any disclaimer, the term of this patent is extended or adjusted under 35 U.S.C. 154(b) by 74 days.

(21) Appl. No.: 14/424,194

(22) PCT Filed: Sep. 10, 2013

(86) PCT No.: PCT/EP2013/068731
§ 371 (c)(1),
(2) Date: Feb. 26, 2015

(87) PCT Pub. No.: WO2014/040992
PCT Pub. Date: Mar. 20, 2014

(65) Prior Publication Data
US 2015/0203728 A1 Jul. 23, 2015

(30) Foreign Application Priority Data
Sep. 11, 2012 (EP) .................................. 12183893

(51) Int. Cl.
| | | |
|---|---|---|
| *C09J 175/08* | (2006.01) | |
| *C08G 18/48* | (2006.01) | |
| *C08G 18/66* | (2006.01) | |
| *C08G 18/76* | (2006.01) | |
| *C08G 18/32* | (2006.01) | |
| *C08G 18/50* | (2006.01) | |
| *C08G 18/79* | (2006.01) | |
| *C08G 18/12* | (2006.01) | |
| *C08G 18/16* | (2006.01) | |
| *C08G 18/20* | (2006.01) | |
| *C08G 18/22* | (2006.01) | |
| *C09J 175/04* | (2006.01) | |
| *B32B 37/12* | (2006.01) | |
| *B32B 37/18* | (2006.01) | |
| *C09J 5/00* | (2006.01) | |

(52) U.S. Cl.
CPC ......... *C09J 175/08* (2013.01); *B32B 37/1284* (2013.01); *B32B 37/18* (2013.01); *C08G 18/12* (2013.01); *C08G 18/163* (2013.01); *C08G 18/2063* (2013.01); *C08G 18/222* (2013.01); *C08G 18/3203* (2013.01); *C08G 18/324* (2013.01); *C08G 18/3234* (2013.01); *C08G 18/482* (2013.01); *C08G 18/4812* (2013.01); *C08G 18/4829* (2013.01); *C08G 18/4837* (2013.01); *C08G 18/4841* (2013.01); *C08G 18/5024* (2013.01); *C08G 18/6685* (2013.01); *C08G 18/7664* (2013.01); *C08G 18/797* (2013.01); *C09J 5/00* (2013.01); *C09J 175/04* (2013.01); *B32B 2037/1253* (2013.01)

(58) Field of Classification Search
CPC .................................................. C08G 18/6685
USPC ......................................................... 156/331.7
See application file for complete search history.

(56) References Cited

U.S. PATENT DOCUMENTS

| | | | | |
|---|---|---|---|---|
| 8,399,595 B2* | 3/2013 | Tribelhorn | ......... | C08G 18/0895 156/331.1 |
| 2009/0030161 A1* | 1/2009 | Johnston | ............... | C07C 275/60 525/457 |
| 2011/0263744 A1* | 10/2011 | Eiben | ................... | C08G 18/222 521/174 |

FOREIGN PATENT DOCUMENTS

| | | |
|---|---|---|
| DE | 10 2008 027914 A1 | 12/2009 |
| EP | 0 442 084 A1 | 8/1991 |
| WO | 02/096968 A1 | 12/2002 |

OTHER PUBLICATIONS

Mar. 17, 2015 International Preliminary Report on Patentability issued in Application No. PCT/EP2013/068731.
Nov. 13, 2013 Search Report issued in International Application No. PCT/EP2013/068731.
Aug. 30, 2016 Office Action issued in Chinese Application No. 201380047220.3.

* cited by examiner

*Primary Examiner* — Mike M Dollinger
(74) *Attorney, Agent, or Firm* — Oliff PLC

(57) ABSTRACT

The invention relates to a two-component polyurethane adhesive having high strength and elasticity at a particularly low glass transition temperature, suitable as a structural adhesive. The adhesive according to the invention contains a triol, a diol, a polyamine, a polyisocyanate and a polyurethane polymer having isocyanate groups in certain ratios, and a Fe(III) or Ti(IV) or Zr(IV) or Hf(IV) chelate-complex-catalyst.

20 Claims, No Drawings

STRUCTURAL POLYURETHANE ADHESIVE HAVING A LOW GLASS TRANSITION TEMPERATURE

TECHNICAL FIELD

The invention relates to the field of two-component polyurethane adhesives, in particular structural polyurethane adhesives.

PRIOR ART

Two-component polyurethane compositions based on polyols and polyisocyanates have been used for a long time as elastic adhesives. They cure rapidly after mixing and can therefore absorb and transfer forces after only a brief time.

Structural adhesives, also referred to as construction adhesives or assembly adhesives, are used in the manufacturing industry for bonding components to one another in such a manner that the adhesive bond is part of a permanently durable construction. Such adhesives are typically tough-elastic and have to satisfy high demands in terms of processability, strength and adhesive forces.

For many glued constructions, it is important for the strength, for example, the elasticity modulus, of the adhesive to be as uniform as possible over the entire range of its utilization temperature, in particular in the temperature range of approximately −35° C. to approximately +80° C., so that the mechanical behavior of the adhesive bond can be taken appropriately into account in the calculation of the construction. Particularly desirable are tough-elastic adhesives of high strength, which have the lowest possible glass transition temperature. These adhesives should be readily processable, usable even at higher layer thicknesses of up to 10 millimeters and more, and capable of being cured without problem to the final strength, both at ambient temperature and also in a curing process accelerated by heating, and they should exhibit good bonding to metal and nonmetal substrates.

DESCRIPTION OF THE INVENTION

Therefore, the object of the present invention is to provide a polyurethane adhesive which combines high strength with a particularly low glass transition temperature and which is consequently excellently suitable as a structural adhesive.

It was found, surprisingly, that a polyurethane adhesive according to Claim 1. Due to its special composition, the adhesive exhibits good processability with high stability after the mixing of the components, good initial adhesive strength, rapid and at the same time interference-free curing as well as very high strength in the cured state. In particular, the adhesive has excellent mechanical behavior, that is to say tough-elastic properties with high strength and good extensibility, which remain largely constant over the temperature range from −35° C. to +85° C. It is particularly surprising that, as a result of the action of a special catalyst, the adhesive achieves a markedly lower glass transition temperature than is the case with other polyurethane catalysts.

Additional aspects of the invention are the subject matter of additional independent claims. Particularly preferred embodiments of the invention are the subject matter of the dependent claims.

WAYS OF CARRYING OUT THE INVENTION

The subject matter of the invention is a polyurethane adhesive consisting of a first and of a second component, wherein the first component contains
a) at least one triol A1 with a molecular weight in the range from 1000 to 10,000 g/mol,
b) at least one diol A2 with two primary hydroxyl groups and a molecular weight in the range from 60 to 150 g/mol, and
c) at least one aliphatic polyamine A3 with a molecular weight in the range from 60 to 500 g/mol;
the second component contains
d) at least one polyisocyanate B1 and
e) at least one polyurethane polymer B2 having isocyanate groups;
and the polyurethane adhesive moreover contains
f) at least one catalyst K in the form of a metal-chelate complex, wherein the metal is selected from the group consisting of Fe(III), Ti(IV), Zr(IV) and Hf(IV);
wherein the triol A1, the diol A2 and the polyamine A3 are present in such a quantity that
g) the ratio V1 of the number of OH groups and the number of $NH_2$ groups of (A2+A3)/A1 is in the range from 3 to 15, and
h) the ratio V2 of the number of OH groups and the number of $NH_2$ groups of A2/A3 is in the range from 2 to 30.

The prefix "poly" in substance names such as "polyol," "polyisocyanate," "polyether" or "polyamine" in the present document indicates that the respective substance formally contains more than one of the functional groups occurring in the name per molecule.

The term "polyurethane polymer" covers all polymers that are produced according to the so-called diisocyanate polyaddition method. The term "polyurethane polymer" also covers polyurethane polymers having isocyanate groups, as can be obtained by reacting polyisocyanates and polyols and which themselves represent polyisocyanates and are also often referred to as prepolymers.

In the present document, the "molecular weight" is always understood to refer to the average molecular weight in the case of polymers.

An OH group that is bound to a C atom with two hydrogens is referred to as a "primary hydroxyl group."

In this document, the term "phase separation" describes the process of demixing highly ordered ("crystalline") regions, also referred to as "hard segments" and less ordered ("amorphous") regions, also referred to as "soft segments," during the curing of the polyurethane adhesive.

In this document, "open time" refers to the time within which the parts to be bonded have to be joined after the components are mixed.

In the present document, "glass transition temperature" denotes the glass transition temperature, determined by means of dynamic mechanical thermoanalysis (DMTA), which temperature is read at the maximum value of the quotient of loss modulus G"/storage modulus G'.

In the present document, the term "strength" denotes the strength of the cured adhesive, wherein strength is understood to mean in particular the tensile strength and the elasticity modulus (E modulus) in the elongation range up to 10%.

In the present document, "room temperature" refers to a temperature of 25° C.

The term "storage-stable" refers to the property of a composition of being able to be stored in an appropriate container for several weeks to several months at room temperature, without its application or utilization properties changing substantially due to the storage.

As triol A1, polyoxyalkylene triols, also referred to as polyether triols, are particularly suitable. They are polymerization products of ethylene oxide, 1,2-propylene oxide, 1,2- or 2,3-butylene oxide or mixtures thereof. Typically, they are polymerized using a starter molecule with three active hydrogen atoms, such as, for example, glycerol, 1,1,1-trimethylolethane, trimethylolpropane or mixtures thereof.

As trial A1, polyoxypropylene triols, polyoxyethylene triols and polyoxypropylene-polyoxyethylene trials are preferable.

It is particularly preferable for the triol A1 to have primary hydroxyl groups. As a result, the polyurethane adhesive is less susceptible to undesirable reactions of isocyanate groups with water that may be present, which can result in the formation of bubbles and incomplete curing.

As triol A1, so-called "EO end-capped" (ethylene oxide end-capped) polyoxypropylene triols are particularly preferable. The latter are special polyoxypropylene-polyoxyethylene triols, which are obtained, for example, by further alkoxylating pure polyoxypropylene triols with ethylene oxide after the completion of the polypropoxylation and which as a result comprise primary hydroxyl groups.

The triol A1 preferably has a mean OH functionality in the range from 2.2 to 3. With such triols A1, adhesives with good mechanical properties are obtained.

The triol A1 preferably has a molecular weight in the range from 3000 to 8000 g/mol, particularly preferably from 4000 to 6000 g/mol. Such a triol has a good combination of high functionality and chain length, so that an adhesive with good mechanical properties is obtained with it.

The trial A1 is used preferably in a quantity from 30 to 70% by weight relative to the total weight of the first component.

As diol A2, 1,2-ethanediol, 1,3-propanediol, 1,4-butanediol, 1,5-pentanediol, 1,6-hexanedial, 1,3-cyclohexanedimethanol, 1,4-cyclohexanedimethanol and diethylene glycol are particularly suitable. These diols are easy to obtain and comprise primary hydroxy groups with hardly any steric hindrance, which are particularly reactive with isocyanate groups.

The dial A2 is preferably a linear diol selected from the group consisting of 1,3-propanediol, 1,4-butanediol and 1,5-pentanediol. These dials are particularly easy to handle because they are barely hydrophilic and are liquid at room temperature, and, during the curing of the adhesive, they promote high strength with good extensibility over a broad temperature range. Among them, 1,4-butanediol is most preferable.

1,5-Pentanedial is also especially preferable. By using it together with the catalyst K, particularly high E moduli and very low glass transition temperatures are reached.

As aliphatic polyamine A3, amines having two or three aliphatic amino groups are suitable, in particular the following commercial polyamines:

aliphatic, cycloaliphatic or arylaliphatic primary diamines such as, in particular, ethylenediamine, 1,2-propanediamine, 1,3-propanediamine, 2-methyl-1,2-propanediamine, 2,2-dimethyl-1,3-propanediamine, 1,3-butanediamine, 1,4-butanediamine, 1,3-pentanediamine (DAMP), 1,5-pentanediamine, 1,5-diamino-2-methylpentane (MPMD), 2-butyl-2-ethyl-1,5-pentanediamine (C11 neodiamine), 1,6-hexanediamine, 2,5-dimethyl-1,6-hexanediamine, 2,2,4- and 2,4,4-trimethylhexamethylenediamine (TMD), 1,7-heptanediamine, 1,8-octanediamine, 1,9-nonanediamine, 1,10-decanediamine, 1,11-undecanediamine, 1,12-dodecanediamine, 1,2-, 1,3- and 1,4-diaminocyclohexane, 1,4-diamino-2,2,6-trimethylcyclohexane (TMCDA), bis(4-aminocyclohexyl)methane ($H_{12}$-MDA), bis(4-amino-3-methylcyclohexyl)methane, bis(4-amino-3-ethylcyclohexyl) methane, bis(4-amino-3,5-dimethylcyclohexyl) methane, bis(4-amino-3-ethyl-5-methylcyclohexyl) methane (M-MECA), 1-amino-3-aminomethyl-3,5,5-trimethylcyclohexane (=isophoronediamine or IPDA), 2- and 4-methyl-1,3-diaminocyclohexane and mixtures thereof, 1,3- and 1,4-bis(aminomethyl)cyclohexane, 2,5(2,6)-bis(aminomethyl)bicyclo[2.2.1]heptane (NBDA), 3(4),8(9)-bis(aminomethyl)tricyclo[5.2.1.$0^{2,6}$]decane, 1,8-methanediamine and 1,3- and 1,4-bis(aminomethyl)benzene;

ether group-containing aliphatic primary diamines such as, in particular, bis(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine and higher oligomers of these diamines, 3,9-bis(3-aminopropyl)-2,4,8,10-tetraoxaspiro-[5.5]undecane, bis(3-aminopropyl)polytetrahydrofurans and other polytetrahydrofurandiamines, Jeffamine® RFD-270 (from Huntsman), as well as polyoxyalkylenediamines ("polyether diamines"). The latter represent products from the amination of polyoxyalkylene diols and are available, for example, under the name Jeffamine® (from Huntsman), under the name Polyetheramine (from BASF) or under the name PC Amine® (from Nitroil). Particularly suitable polyoxyalkylenediamines are Jeffamine® D-230, Jeffamine® D-400, Polyetheramine D 230, Polyetheramine D 400, PC Amine® DA 250 and PC Amine® DA 400; and polyoxyalkylene triamines ("polyether triamines"), which represent products from the amination of polyoxyalkylene trials and which are available, for example, under the commercial name Jeffamine® (from Huntsman), under the name Polyetheramine (from BASF) or under the name PC Amine® (from Nitroil), such as, in particular, Jeffamine® T-403, Polyetheramine T403, and PC Amine® TA 403.

It is particularly preferable for the polyamine A3 to be selected from the group consisting of 1,5-diamino-2-methylpentane, 2,2,4- and 2,4,4-trimethylhexamethylenediamine, 1,8-octanediamine, 1,10-decanediamine, 1,12-dodecanediamine, 1-amino-3-aminomethyl-3,5,5-trimethylcyclohexane, 2- and 4-methyl-1,3-diaminocyclohexane and mixtures thereof, 1,3-bis(aminomethyl)cyclohexane, 1,4-bis(aminomethyl)cyclohexane, 2,5(2,6)-bis(aminomethyl)-bicyclo[2.2.1]heptane, 3(4),8(9)-bis(aminomethyl)tricyclo[5.2.1.$0^{2,6}$]decane, bis(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 1,3-bis(aminomethyl)benzene and 1,4-bis(aminomethyl)benzene.

These polyamines, in the reaction with isocyanates, lead to urea groups that undergo particularly satisfactory phase separation. Adhesives produced therewith have particularly high strengths, in particular high elasticity moduli, and a not very pronounced dependency of the mechanical properties on the temperature.

Among them, 1,3-bis(aminomethyl)cyclohexane and 1,3-bis(aminomethyl)benzene are preferable; 1,3-bis(aminomethyl)benzene is most preferable. With these polyamines, cured adhesives with very particularly high strengths form.

The selection of the triol A1, of the diol A2 and of the polyamine A3 and their use in certain ratios carefully adjusted to one another confers good processing properties and excellent strength to the adhesive, wherein amorphous and crystalline regions are present with very good demixing.

The ratio V1 is preferably 3-10. Such adhesives have a particularly low glass transition temperature.

The ratio V1 is particularly preferably 3-9. Such adhesives have a very particularly low glass transition temperature.

The ratio V1 is preferably 4-15. Such adhesives have a high elasticity modulus.

The ratio V1 is particularly preferably 5-15. Such adhesives have a particularly high elasticity modulus.

The ratio V1 is preferably in the range from 4 to 10, in particular 5 to 9. Such adhesives have a particularly low glass transition temperature and at the same time a particularly high elasticity modulus.

The ratio V2 is preferably 2-15. Such adhesives have a certain stability with a long open time.

The ratio V2 is particularly preferably 2-10. Such adhesives have good stability with an easily manageable open time.

The ratio V2 is preferably 4.5-30 or higher. Such adhesives have very good stability with a short open time.

The ratio V2 is particularly preferably 5-30. Such adhesives have good stability with an easily manageable open time.

The ratio V2 is preferably in the range from 4.5 to 15, in particular in the range from 5 to 10. Such adhesives show a good combination of good stability at the time of application and an easily manageable open time.

As polyisocyanate B1, monomeric di- or triisocyanates, as well as oligomers, polymers and derivatives of the monomeric di- or triisocyanates, as well as any mixtures thereof are suitable.

Suitable aromatic monomeric di- or triisocyanates are, in particular, 2,4- and 2,6-toluylene diisocyanate and any mixtures of these isomers (TDI), 4,4'-, 2,4'- and 2,2'-diphenylmethane diisocyanate and any mixtures of these isomers (MDI), mixtures of MDI and MDI homologs (polymer MDI or PMDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODI), dianisidine diisocyanate (DADI), 1,3,5-tris-(isocyanatomethyl)benzene, tris-(4-isocyanatophenyl)methane and tris-(4-isocyanatophenyl)thiophosphate.

Suitable aliphatic monomeric di- or triisocyanates are, in particular, 1,4-tetramethylene diisocyanate, 2-methylpentamethylene-1,5-diisocyanate, 1,6-hexamethylene diisocyanate (HDI), 2,2,4- and 2,4,4-trimethyl-1,6-hexamethylene diisocyanate (TMDI), 1,10-decamethylene diisocyanate, 1,12-dodecamethylene diisocyanate, lysine and lysine ester diisocyanate, cyclohexane-1,3- and -1,4-diisocyanate, 1-methyl-2,4- and -2,6-diisocyanatocyclohexane and any mixtures of these isomers (HTDI or H$_6$TDI), 1-isocyanato-3,3,5-trimethyl-5-isocyanatomethyl cyclohexane (=isophorone diisocyanate or IPDI), perhydro-2,4'- and -4,4'-diphenylmethane diisocyanate (HMDI or H$_{12}$MDI), 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethyl-1,3- and -1,4-xylylene diisocyanate (m- and p-TMXDI), bis(1-isocyanato-1-methylethyl)naphthalene, dimer- and trimer fatty acid isocyanates such as 3,6-bis(9-isocyanatononyl)-4,5-di-(1-heptenyl)cyclohexene (dimeryl diisocyanate) and α,α,α',α',α",α"-hexamethyl-1,3,5-mesitylene triisocyanate.

Suitable oligomers, polymers and derivatives of the mentioned monomeric di- and triisocyanates are derived particularly from MDI, TDI, HDI and IPDI. Of those, commercial types are particularly suitable, in particular HDI-biurets such as Desmodur® N 100 and N 3200 (from Bayer), Tolonate® HDB and HDB-LV (from Rhodia) and Duranate® 24A-100 (from Asahi Kasei); HDI isocyanurates such as Desmodur® N 3300, N 3600 and N 3790 BA (all from Bayer), Tolonate® HDT, HDT-LV and HDT-LV2 (from Rhodia), Duranate® TPA-100 and THA-100 (from Asahi Kasei) and Coronate® HX (from Nippon Polyurethane); HDI uretdiones such as Desmodur® N 3400 (from Bayer); HDI iminooxadiazindiones such as Desmodur® XP 2410 (from Bayer); HDI allophanates such as Desmodur® VP LS 2102 (from Bayer); IPDI isocyanurates such as, for example, in solution as Desmodur® Z 4470 (from Bayer) or in solid form as Vestanat® T1890/100 (from Degussa); TDI oligomers such as Desmodur® IL (from Bayer); as well as mixed isocyanurates based on TDI/HDI, for example, as Desmodur® HL (from Bayer). Moreover, particularly suitable are forms of MDI that are liquid at room temperature (so-called "modified MDI"), which represent mixtures of MDI with MDI derivatives such as, in particular, MDI carbodiimides or MDI uretonimines or MDI urethanes, known under commercial names such as Desmodur® CD, Desmodur® PF, Desmodur® PC (all from Bayer) or Isonate® M 143 (from Dow), as well as mixtures of MDI and MDI homologs (polymer MDI or PMDI), available under commercial names such as Desmodur® VL, Desmodur® VL50, Desmodur® VL R10, Desmodur® VL R20, Desmodur® VH 20 N and Desmodur® Desmodur® VKS 20F (all from Bayer), Isonate® M 309, Voranate® M 229 and Voranate® M 580 (all from Dow) or Lupranat® M 10 R (from BASF). The above-mentioned oligomer polyisocyanates in practice usually represent mixtures of substances with different oligomerization degrees and/or chemical structures. Preferably, they have a mean NCO functionality from 2.1 to 4.0.

As polyisocyanate B1, forms of MDI that are liquid at room temperature are preferable. They are, in particular, so-called polymer MDI as well as MDI with contents of oligomers or derivatives thereof. The content of MDI (=4,4'-2,4'- and 2,2'-diphenylmethane diisocyanate and any mixtures of these isomers) of such liquid forms of MDI is at least in particular 50 to 95% by weight, in particular 60 to 90% by weight.

Particularly preferable as polyisocyanate B1 are forms of MDI which are liquid at room temperature and which comprise a content of 4,4'-diphenylmethane diisocyanate of at least 40% by weight, preferably at least 50% by weight, in particular at least 60% by weight, Such polyisocyanates B1 allow a rapid curing.

As polyisocyanate B1, polymer MDI and in particular MDT types which are liquid at room temperature and which contain contents of MDI-carbodiimides or adducts thereof are particularly preferable.

With these polyisocyanates B1, particularly good processing properties and particularly high strengths are obtained.

The polyurethane polymer B2 preferably has 50-95% by weight, in particular 70-90% by weight, polyoxyalkylene units, particularly preferably polyoxyethylene and/or polyoxypropylene units, in particular polyoxypropylene units. Such a polyurethane polymer has a low viscosity and it allows good extensibilities.

The polyurethane polymer B2 preferably has an average molecular weight from 1000 to 20,000 g/mol, particularly preferably from 2000 to 10,000 g/mol.

The polyurethane polymer B2 preferably has a mean NCO functionality in the range from 1.7 to 3, in particular from 1.8 to 2.5. Such a polyurethane polymer allows good processing properties and good mechanical properties in the cured state.

The polyurethane polymer B2 preferably has a mean NCO functionality from 2.05 to 2.5, Such a polyurethane polymer allows a good extensibility with high strength.

The polyurethane polymer B2 preferably has a content of free isocyanate groups from 1 to 10% by weight, particularly preferably from 1 to 5% by weight.

The polyurethane polymer B2 preferably comprises urethane groups and free isocyanate groups which are derived from 4,4'-diphenylmethane diisocyanate.

With it, during the curing of the adhesive, particularly good hard segments and thus particularly high strengths are obtained.

A suitable polyurethane polymer B2 having isocyanate groups can be obtained by reacting at least one polyisocyanate with at least one polyol. This reaction can occur by reacting the polyol and the polyisocyanate using customary methods, for example, at temperatures from 50° C. to 100° C., optionally with simultaneous use of suitable catalysts, wherein the polyisocyanate is metered such that its isocyanate groups in relation to the hydroxyl groups of the polyol are present in stoichiometric excess. The polyisocyanate is advantageously metered such that an NCO/OH ratio from 1.3 to 5, in particular from 1.5 to 3, is maintained. "NCO/OH ratio" is understood to mean the ratio of the number of isocyanate groups used to the number of hydroxyl groups used. In the polyurethane polymer B2, after the reaction of all the hydroxyl groups of the polyol, it is preferable for a content of free isocyanate groups of 1 to 10% by weight, particularly preferably from 1 to 5% by weight, to remain.

The polyurethane polymer B2 has an average molecular weight of preferably 500 g/mol or higher. In particular, the polyurethane polymer B2 has an average molecular weight from 1000 to 20,000 g/mol, preferably from 2000 to 10,000 g/mol.

Moreover, the polyurethane polymer B2 preferably has a mean NCO functionality in the range from 1.7 to 3, in particular from 1.8 to 2.5.

Such a polyurethane polymer allows good processing properties and good mechanical properties in the cured state.

As polyol for producing a polyurethane polymer B2, the following commercial polyols or mixtures thereof are particularly suitable:

polyoxyalkylene polyols, also referred to as polyether polyols or oligoetherols, which are polymerization products of ethylene oxide, 1,2-propylene oxide, 1,2- or 2,3-butylene oxide, oxetane, tetrahydrofuran or mixtures thereof, optionally polymerized using a starter molecule having two or more active hydrogen atoms, such as, for example, water, ammonia or compounds having several OH or NH groups, such as, for example, 1,2-ethanediol, 1,2- and 1,3-propanediol, neopentyl glycol, diethylene glycol, triethylene glycol, the isomer dipropylene glycols and tripropylene glycols, the isomer butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, as well as mixtures of the above-mentioned compounds. It is also possible to use polyoxyalkylene polyols that have a low unsaturation degree (measured according to ASTM D-2849-69 and indicated in milliequivalent of unsaturation per gram of polyol (mEq/g)), produced, for example, using so-called double metal cyanide catalysts (DMC catalysts), and also polyoxyalkylene polyols with a higher unsaturation degree, produced, for example, using anionic catalysts such as NaOH, KOH, CsOH or alkali alcoholates.

Particularly suitable are polyoxyalkylene diols or polyoxyalkylene triols, in particular polyoxyethylene and polyoxypropylene di- and -triols.

Particularly suitable are polyoxyalkylene diols and trials with an unsaturation degree of less than 0.02 mEq/g and with a molecular weight in the range from 1000-30,000 g/mol, as well as polyoxypropylene diols and triols with a molecular weight of 400-8000 g/mol.

Especially suitable are so-called ethylene oxide endcapped ("EO end-capped") polyoxypropylene polyols.

Styrene-acrylonitrile or acrylonitrile-methylmethacrylate grafted polyether polyols.

Polyester polyols, also referred to as oligoesterols, produced according to known methods, in particular the polycondensation of hydroxycarboxylic acids or the polycondensation of aliphatic and/or aromatic polycarboxylic acids with bivalent or polyvalent alcohols.

Particularly suitable polyester polyols are those produced from bivalent to trivalent, in particular bivalent, alcohols such as, for example, ethylene glycol, diethylene glycol, propylene glycol, dipropylene glycol, neopentyl glycol, 1,4-butanediol, 1,5-pentanedial, 3-methyl-1,5-hexanediol, 1,6-hexanediol, 1,8-octanediol, 1,10-decanediol, 1,12-dodecanediol, 1,12-hydroxystearylalcohol, 1,4-cyclohexanedimethanol, dimer fatty acid diol (dimer dial), hydroxypivalic acid neopentyl glycol esters, glycerol, 1,1,1-trimethylolpropane or mixtures of the above-mentioned alcohols, with organic di- or tricarboxylic acids, in particular dicarboxylic acids, or their anhydrides or esters, such as, for example, succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic acid anhydride, isophthalic acid, terephthalic acid, dimethyl terephthalate, hexahydrophthalic acid, trimellitic acid and trimellitic acid anhydride, or mixtures of the above-mentioned acids, as well as polyester polyols from lactones, such as, for example, from ε-caprolactone and starters such as the above-mentioned bivalent or trivalent alcohols.

Particularly suitable polyester polyols are polyester diols.

Polycarbonate polyols, which can be obtained by reacting, for example, the above-mentioned alcohols—used for the construction of the polyester polyols—with dialkyl carbonates, diaryl carbonates or phosgene.

At least two hydroxyl-group-carrying block copolymers which comprise at least two different blocks having a polyether, polyester and/or polycarbonate structure of the above-described type, in particular polyether-polyester polyols.

Polyacrylate and polymethacrylate polyols.

Polyhydroxy functional fats and oils, for example, natural fats and oils, in particular *ricinus* oil; or polyols—socalled oleochemical polyols—obtained by chemical modification of natural fats and oils, for example, the epoxy polyesters or epoxy polyethers obtained by epoxidation of unsaturated oils and subsequent ring opening with carboxylic acids or alcohols, or polyols obtained by hydroformylation and hydrogenation of unsaturated oils; or polyols obtained from natural fats and oils by degradation processes such as alcoholysis or ozonolysis and subsequent chemical bonding, for example, by transesterification or dimerization of the degradation products thus obtained or of derivatives thereof. Suitable degradation products of natural fats and oils are, in particular, fatty acids and fatty alcohols as well as fatty acid esters, in particular methyl esters (FAME), which can be derivatized, for example, by hydroformylation and hydrogenation to form hydroxy fatty acid esters.

Polyhydrocarbon polyols, also referred to as oligohydrocarbonols, such as, for example, polyhydroxy functional polyolefins, polyisobutylenes, polyisoprenes; polyhydroxy functional ethylene-propylene-, ethylene-butylene- or ethylene-propylene-diene copolymers, which are produced, for example, by the company Kraton Polymers; polyhydroxy functional polymers of dienes, in particular of 1,3-butadiene, which can be produced in particular also by anionic polymerization; polyhydroxy functional copolymers made of dienes such as 1,3-butadiene or diene mixtures, and vinyl monomers such as styrene, acrylonitrile, vinylchloride, vinylacetate, vinylalcohol, isobutylene and isoprene, for example, polyhydroxy functional acrylonitrile/butadiene copolymers, which can be produced, for example, from epoxides or amino alcohols and carboxyl-terminated acrylonitrile/butadiene copolymers (available commercially, for example, under the name Hypro® (formally Hycar®) CTBN and CTBNX and ETBN from Nanoresins AG, Germany or Emerald Performance Materials LLC); as well as hydrogenated polyhydroxy functional polymers or copolymers of dienes.

As the polyol for preparing a polyurethane polymer B2, polyoxyalkylene polyols, polyester polyols, polycarbonate polyols and polyacrylate polyols are preferable. Particularly preferable are polyoxyalkylene polyols, in particular polyoxypropylene polyols and polyoxyethylene-polyoxypropylene mixed polyols.

The polyol for producing a polyurethane polymer B2 preferably has a molecular weight of 500-20,000 g/mol, in particular of 1000 to 8000 g/mol.

The polyol for producing a polyurethane polymer B2 is preferably a dial or a mixture of at least one diol and at least one triol, in particular a mixture of at least one diol and at least one triol.

Together with the polyol, contents of low molecular weight bivalent or polyvalent alcohols can be used simultaneously for manufacturing the polyurethane polymer B2, in particular 1,2-ethanediol, 1,2-propanediol, neopentyl glycol, diethylene glycol, triethylene glycol, the isomer dipropylene glycols and tripropylene glycols, the isomer butanediols, pentanediols, hexanediols, heptanediols, octanediols, nonanediols, decanediols, undecanediols, 1,3- and 1,4-cyclohexanedimethanol, hydrogenated bisphenol A, dimer fatty alcohols, 1,1,1-trimethylolethane, 1,1,1-trimethylolpropane, glycerol, pentaerythritol, sugar alcohols such as xylitol, sorbitol or mannitol, sugars such as sucrose, other higher-grade alcohols, low molecular weight alkoxylation products of the above-mentioned bivalent and polyvalent alcohols, as well as mixtures of the above-mentioned alcohols.

As polyisocyanate for producing a polyurethane polymer B2, the following commercial polyisocyanates or mixtures thereof are particularly suitable:

2,4- and 2,6-toluylene diisocyanate and any mixtures of these isomers (TDI), 4,4'-, 2,4'- and 2,2'-diphenylmethane diisocyanate and any mixtures of these isomers (MDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODI), 1,3,5-tris-(isocyanatomethyl)benzene, 2-methylpentamethylene-1,5-diisocyanate, 1,6-hexamethylene diisocyanate (HDI), 2,2,4- and 2,4,4-trimethyl-1,6-hexamethylene diisocyanate (TMDI), 1,10-decamethylene diisocyanate, 1,12-dodecamethylene diisocyanate, lysine and lysine ester diisocyanate, cyclohexane-1,3- and -1,4-diisocyanate, 1-methyl-2,4- and -2,6-diisocyanatocyclohexane and any mixtures of these isomers (HTDI or $H_6$TDI), 1-isocyanato-3,3,5-trimethyl-5-isocyanatomethylcyclohexane (=isophorone diisocyanate or IPDI), perhydro-2,4'- and -4,4'-diphenylmethane diisocyanate (HMDI or $H_{12}$MDI), 1,4-diisocyanato-2,2,6-trimethylcyclohexane (TMCDI), 1,3- and 1,4-bis(isocyanatomethyl) cyclohexane, m- and p-xylylene diisocyanate (m- and p-XDI) and m- und p-tetramethyl-1,3- and -1,4-xylylene diisocyanate (m- and p-TMXDI). MDI, TDI, IPDI and HDI are preferable. MDI is particularly preferable. 4,4'-Diphenylmethane diisocyanate is most preferable. Using this MDI isomer, during the curing with the diols A2 und polyamines A3, particularly good hard segments and thus particularly high strengths are obtained.

The polyisocyanate B1 and the polyisocyanate used for the preparation of the polyurethane prepolymer B2 are preferably different types of polyisocyanate.

The polyisocyanate B1 is particularly preferably a MDI that is liquid at room temperature, and the polyisocyanate used for the preparation of the polyurethane polymer B2 is preferably 4,4'-diphenylmethane diisocyanate, which is typically solid at room temperature. Here, the second component is liquid at room temperature, which allows simple processing, and enables particularly good mechanical properties. A defined mixture of polyisocyanate B1 and polyurethane polymer B2 can be achieved by first producing the polyurethane polymer B2 separately before it is mixed with the polyisocyanate B1.

Thus the preparation of the polyurethane polymer B2 preferably is not carried out in the presence of the polyisocyanate B1.

The weight ratio between the polyisocyanate B1 and the polyurethane polymer B2 is preferably 0.25 to 4, preferably 0.25 to 2, particularly preferably 0.3 to 1.5, and in particular 0.4 to 1.0. Such a second component allows adhesives with good processability, high strength and high extension.

The polyurethane adhesive contains at least one catalyst K in the form of a metal-chelate complex, wherein the metal is selected from the group consisting of Fe(III), Ti(IV), Zr(IV) and Hf(IV).

In the present document, metal carboxylates and metal alcoholates are not referred to as metal-chelate complexes unless they comprise at least one chelate ligand.

Suitable chelate ligands on the catalyst K are in particular
1,3-diketonates, in particular acetylacetonate (2,4-pentanedionate), 2,2,6,6-tetramethyl-3,5-heptanedionate, 1,3-diphenyl-1,3-propanedionate (dibenzoyl methanate), 1-phenyl-1,3-butananedionate and 2-acetylcyclohexanonate;

1,3-ketoesterates, in particular methylacetoacetate, ethylacetoacetate, ethyl-2-methylacetoacetate, ethyl-2-ethylacetoacetate, ethyl-2-hexylacetoacetate, ethyl-2-phenylacetoacetate, propylacetoacetate, isopropylacetoacetate, butylacetoacetate, tert-butylacetoacetate, ethyl-3-oxovalerate, ethyl-3-oxohexanoate and 2-oxocyclohexanecarboxylic acid ethyl esterate, and 1,3-ketoamidates, in particular N,N-diethyl-3-oxobutane amidate, N,N-dibutyl-3-oxobutane amidate, N,N-bis(2-ethylhexyl)-3-oxobutane amidate, N,N-bis(2-methoxyethyl)-3-oxobutane amidate, N,N-dibutyl-3-oxoheptane amidate, N,N-bis(2-methoxyethyl)-3-oxoheptane amidate, N,N-bis(2-ethylhexyl)-2-oxocyclopentane carboxamidate, N,N-dibutyl-3-oxo-3-phenylpropane amidate, N,N-bis(2-methoxyethyl)-3-oxo-3-phenylpropane amidate and N-polyoxyalkylene-1,3-ketoamidates such as acetoamidates of polyoxyalkylene amines with one, two or three amino groups and a molecular weight up to 5000 g/mol, in particular the types SD-231, SD-401, SD-2001, ST-404, D-230, D-400, D-2000, T-403, M-600 and XTJ-581 available from Huntsman under the Jeffamine® trade names.

In the polyurethane adhesive, the catalyst K produces a rapid curing which takes place with surprisingly few disturbances; in particular, bubbles form less commonly than with other catalysts according to the prior art. In addition, the catalyst K surprisingly influences the polyurethane adhesive such that, after curing, the latter has a significantly lower glass transition temperature than if other catalysts according to the prior art are used, such as 1,4-diazobicyclo[2.2.2]octane (DABCO) or dibutyltin dilaurate, for example. For a structural adhesive, a low glass transition temperature is very advantageous, since the adhesive remains more constant during cooling in terms of its mechanical properties and since it reaches the point less rapidly where it becomes very stiff and even brittle. In conventional structural adhesives based on two-component polyurethane compositions, the glass transition temperature is typically in the vicinity of −30° C. or higher. Because such temperature values are reached under extreme winter conditions, a downward shift of the glass transition temperature by a few degrees Celsius can suffice to make a reliable use of this adhesive possible even under these conditions.

The catalyst K preferably comprises at least one chelate ligand selected from the group consisting of 1,3-diketonate, 1,3-ketoesterate and 1,3-ketoamidate.

In addition to at least one of the mentioned chelate ligands, the metal-chelate complex can comprise additional ligands that do not form chelates, particularly alcoholates such as methanolate, ethanolate, propanolate, isopropanolate, butanolate, tert-butanolate, isobutanolate, pentanolate, neopentanolate, hexanolate, octanolate or 2-ethylhexanolate; as well as carboxylates such as formiate, acetate, propionate, butanoate, isobutanoate, pentanoate, hexanoate, cyclohexanoate, heptanoate, octanoate, 2-ethylhexanoate, nonanoate, decanoate, neodecanoate, undecanoate, dodecanoate, lactate, oleate, citrate, benzoate, salicylate and phenylacetate.

The catalysts K are particularly preferably represented by the following metal-chelate complexes:

iron(III) tris(acetylacetonate), iron(III) tris(1,3-diphenylpropane-1,3-dionate), iron(III) tris(ethylacetoacetate), iron(III) tris(tert-butylacetoacetate), iron(III) tris(ethyl-3-oxo-valerate), iron(III) tris(ethyl-3-oxo-hexanoate), iron(III) tris(N,N-diethyl-3-oxobutane amidate), iron(III) tris(N,N-dibutyl-3-oxobutane amidate), iron(III) tris(N,N-bis(2-ethylhexyl)-3-oxobutane amidate), iron(III) tris(N,N-bis(2-methoxyethyl)-3-oxobutane amidate), iron(III) tris(N,N-dibutyl-3-oxoheptane amidate), iron(III) tris(N,N-bis(2-methoxyethyl)-3-oxoheptane amidate), iron(III) tris(N,N-bis(2-ethylhexyl)-2-oxo-cyclopentane carboxamidate) and iron(III) tris(N,N-dibutyl-3-oxo-3-phenylpropane amidate); titanium(IV) bis(acetylacetonato)diisopropylate, titanium (IV) bis(acetylacetonato)diisobutylate, titanium(IV) bis(acetylacetonato)-bis(2-ethylhexylate), titanium(IV) bis(1,3-diphenylpropane-1,3-dionato)diisopropylate, titanium (IV) bis(1,3-diphenylpropane-1,3-dionato)diisobutylate, titanium(IV) bis(1,3-diphenylpropane-1,3-dionato)-bis(2-ethylhexylate), titanium(IV) bis(ethylacetoacetato)diisopropylate, titanium(IV) bis(ethylacetoacetato)diisobutylate, titanium(IV) bis(ethylacetoacetato)-bis(2-ethylhexylate), titanium(IV) bis(tert-butylacetoacetato)diisopropylate, titanium(IV) bis(tert-butylacetoacetato)diisobutylate, titanium (IV) bis(tert-butylacetoacetato)-bis(2-ethylhexylate), titanium(IV) bis(ethyl-3-oxo-valerato)diisopropylate, titanium (IV) bis(ethyl-3-oxo-valerato)diisobutylate, titanium(IV) bis(ethyl-3-oxo-valerato)-bis(2-ethylhexylate), titanium(IV) bis(ethyl-3-oxo-hexanoato)diisopropylate, titanium(IV) bis (ethyl-3-oxo-hexanoato)diisobutylate, titanium(IV) bis (ethyl-3-oxo-hexanoato)-bis(2-ethylhexylate), titanium(IV) bis(N,N-diethyl-3-oxobutane amidato)diisopropylate, titanium(IV) bis(N,N-diethyl-3-oxobutane amidato)diisobutylate, titanium(IV) bis(N,N-diethyl-3-oxobutane amidato)-bis(2-ethylhexylate), titanium(IV) bis(N,N-dibutyl-3-oxobutane amidato)diisopropylate, titanium(IV) bis(N,N-dibutyl-3-oxobutane amidato)diisobutylate, titanium(IV) bis(N,N-dibutyl-3-oxobutane amidato)-bis(2-ethylhexylate), titanium(IV) bis(N,N-dibutyl-3-oxoheptane amidato) diisopropylate, titanium(IV) bis(N,N-dibutyl-3-oxoheptane amidato)diisobutylate, titanium(IV) bis(N,N-dibutyl-3-oxoheptane amidato)-bis(2-ethylhexylate), titanium(IV) bis(N, N-bis(2-ethylhexyl)-3-oxobutane amidato)diisopropylate, titanium(IV) bis(N,N-bis(2-ethylhexyl)-3-oxobutane amidato)diisobutylate, titanium(IV) bis(N,N-bis(2-ethylhexyl)-3-oxobutane amidato)-bis(2-ethylhexylate), titanium(IV) bis (N,N-bis(2-ethylhexyl)-2-oxo-cyclopentane carboxamidato) diisopropylate, titanium(IV) bis(N,N-bis(2-ethylhexyl)-2-oxo-cyclopentane carboxamidato)diisobutylate, titanium (IV) bis(N,N-bis(2-ethylhexyl)-2-oxo-cyclopentane carboxamidato)-bis(2-ethylhexylate), titanium(IV) bis(N,N-dibutyl-3-oxo-3-phenylpropanamidato)diisopropylate, titanium(IV) bis(N,N-dibutyl-3-oxo-3-phenylpropanamidato) diisobutylate and titanium(IV) bis(N,N-dibutyl-3-oxo-3-phenylpropanamidato)-bis(2-ethylhexylate); zirconium(IV) tetrakis(acetylacetonate), zirconium(IV) tetrakis(1,3-diphenylpropane-1,3-dionate), zirconium(IV) tetrakis(1-phenylbutane-1,3-dionate), zirconium(IV) tetrakis(ethylacetoacetate), zirconium(IV) tetrakis(tert-butylacetoacetate), zirconium(IV) tetrakis(ethyl-3-oxo-valerate), zirconium(IV) tetrakis(ethyl-3-oxo-hexanoate), zirconium(IV) tetrakis(N, N-diethyl-3-oxobutane amidate), zirconium(IV) tetrakis(N, N-dibutyl-3-oxobutane amidate), zirconium(IV)tetrakis-(N, N-dibutyl-3-oxoheptane amidate), zirconium(IV) tetrakis (N,N-bis(2-ethylhexyl)-3-oxobutane amidate), zirconium (IV) tetrakis(N,N-bis(2-ethylhexyl)-2-oxo-cyclopentane carboxamidate) and zirconium(IV) tetrakis-(N,N-dibutyl-3-oxo-3-phenylpropanamidate); as well as the corresponding compounds with hafnium(IV) instead of zirconium(IV).

The catalysts K is very particularly preferably selected from the group consisting of iron(III) tris(acetylacetonate), iron(III) tris(ethylacetoacetate), iron(III) tris(tert-butylacetoacetate), iron(III) tris(N,N-diethyl-3-oxobutane amidate), titanium(IV) bis(acetylacetonato)diisopropylate, titanium (IV) bis(acetylacetonato)diisobutylate, titanium(IV) bis (acetylacetonato)-bis(2-ethylhexylate), titanium(IV) bis (ethylacetoacetato)diisopropylate, titanium(IV) bis (ethylacetoacetato)diisobutylate, titanium(IV) bis (ethylacetoacetato)-bis(2-ethylhexylate), titanium(IV) bis (tert-butylacetoacetato)diisopropylate, titanium(IV) bis(tert-butylacetoacetate)diisobutylate, titanium(IV) bis(N,N-diethyl-3-oxobutane amidato)diisopropylate, titanium(IV) bis(N,N-diethyl-3-oxobutane amidato)diisobutylate, titanium(IV) bis(N,N-diethyl-3-oxobutane amidato)-bis(2-ethylhexylate), zirconium(IV) tetrakis(acetylacetonate), zirconium(IV) tetrakis(1,3-diphenylpropane-1,3-dionate), zirconium(IV) tetrakis(ethylacetoacetate), zirconium(IV) tetrakis(tert-butylacetoacetate), zirconium(IV) tetrakis(ethyl-3-oxo-valerate), zirconium(IV) tetrakis(ethyl-3-oxohexanoate), zirconium(IV) tetrakis(N,N-diethyl-3-oxobutane amidate), zirconium(IV) tetrakis(N,N-dibutyl-3-oxobutane amidate), zirconium(IV) tetrakis-(N,N-dibutyl-3-oxoheptane amidate) and zirconium(IV) tetrakis(N,N-bis(2-ethylhexyl)-3-oxobutane amidate).

These catalysts K have good catalytic activity and are based on readily accessible starting materials.

The catalyst K in the polyurethane adhesive is preferably present in a quantity such that the adhesive has an open time in the range from 1 minute to 2 hours, preferably 2 minutes to 1 hour, particularly preferably 5 to 30 minutes. The open time of the adhesive here is influenced as well by the type of the catalyst K, the quantity and the type of the triols A1, diols A2, polyamines A3, polyisocyanates B1, polyurethane polymers B2 present and additional substances that are reactive with isocyanates and influenced by the existing temperature and air humidity.

The catalyst K can be present as a constituent of the first and/or as a constituent of the second component in the polyurethane adhesive.

The catalyst K can be used as a powder, as a liquid or as a solution.

As a constituent of the first component, the polyurethane adhesive can additionally contain other substances capable of reacting with isocyanate groups.

In particular, the first component can contain at least one polyol and/or at least one low molecular weight bivalent or polyvalent alcohol, which were mentioned for the preparation of the polyurethane polymer B2.

Moreover, the polyurethane adhesive can contain additional catalysts that accelerate the reaction of hydroxyl groups with isocyanate groups, in particular tin, zinc and bismuth organic metal catalysts, for example, dibutyltin dilaurate or tertiary amines, amidines or guanidines, for example, 1,4-diazabicyclo[2.2.2]octane (DABCO) or 1,8-diazabicyclo[5.4.0]undec-7-ene (DBU). The polyurethane adhesive preferably contains no additional curing catalysts apart from one or more catalysts K.

Moreover, the polyurethane adhesive can contain a so-called latent curing agent, in particular polyaldimine.

In addition to the mentioned additional constituents conventionally used in two-component polyurethane compositions, the polyurethane can contain, in particular, the following:
- plasticizers, particularly carboxylic acid esters, such as phthalates, in particular dioctyl phthalate, diisononyl phthalate or diisodecyl phthalate, adipates, in particular dioctyl adipate, azelates and sebacates, organic phosphoric and sulfonic acid esters or polybutenes;
- solvents;
- inorganic and organic fillers, in particular ground or precipitated calcium carbonates which are optionally coated with fatty acids, in particular stearates, barite (heavy spar), talcs, quartz meals, quartz sand, dolomite, wollastonite, kaolin, mica, aluminum oxides, aluminum oxides, silicic acids, in particular highly dispersed silicic acids from pyrolysis processes, cements, plasters, fly ash, soot, in particular industrially produced soot (hereinafter referred to as "soot"), graphite, metal powder, for example of aluminum, copper, iron, zinc, silver or steel, PVC powders or hollow beads;
- fibers made of polyethylene, for example;
- pigments, for example, titanium dioxide, zinc oxide or iron oxides;
- rheology modifiers, in particular thickeners or thixotropic agents, for example, sheet silicates such as bentonites, derivatives of *ricinus* oil, hydrogenated *ricinus* oil, polyamides, polyamide waxes, polyurethanes, urea compounds, pyrogenic silicic acids, cellulose ethers and hydrophobically modified polyoxyethylenes;
- drying agents such as, for example, molecular sieves, calcium oxide, highly reactive isocyanates such as p-tosylisocyanate, monomeric diisocyanates, mono-oxazolidines such as Incozol® 2 (from Incorez), orthoformic acid esters, alkoxysilanes such as tetraethoxysilane and organoalkoxysilanes such as, in particular, vinyl trimethoxysilane;
- adhesive promoters, for example, organoalkoxysilanes such as aminosilanes, mercaptosilanes, epoxysilanes, vinylsilanes, (meth)acrylsilanes, isocyanatosilanes, carbamatosilanes, alkylsilanes, S-(alkylcarbonyl)mercaptosilanes and aldiminosilanes, as well as oligomer forms of these silanes, in particular, 3-glycidoxypropyltrimethoxysilane, 3-aminopropyltrimethoxysilane, N-(2-aminoethyl)-3-aminopropyltrimethoxysilane, N-(2-aminoethyl)-N-[3-(trimethoxysilyl)propyl]ethylenediamine, 3-mercaptopropyltrimethoxysilane, 3-isocyanatopropyltrimethoxysilane, 3-ureidopropyltrimethoxysilane, 3-chloropropyltrimethoxysilane, vinyltrimethoxysilane, or the corresponding organosilanes with ethoxy groups instead of the methoxy groups;
- stabilizers against oxidation, heat, light and UV radiation;
- flame-retardant substances, for example, aluminum hydroxides, magnesium hydroxide, phosphoric acid esters;
- surfactants, in particular crosslinking agents, leveling agents, deaerating agents or defoaming agents;
- biocides, particularly algicides, fungicides or substances that inhibit fungal growth.

When using additional component parts of the polyurethane adhesive, it is advantageous to ensure that they do not strongly affect the storage stability of the respective components. If such substances are to be stored together with isocyanates, this means in particular that they should contain no water or at most traces of water. It can be appropriate to chemically or physically dry certain constituents before admixing.

The components of the polyurethane adhesive are advantageously formulated in such a manner that the mixing ratio of the volumes between the first and second components is in the range from 1:3 to 3:1, in particular 1:2 to 2:1. This ratio is preferably approximately 1:1.

The mixing ratio is preferably adjusted such that, in the mixed polyurethane adhesive, the ratio between the number of isocyanate groups and the number of groups that are reactive with isocyanates, in particular the sum of OH and $NH_2$ groups, before curing, is approximately in the range from 1.2 to 1, preferably 1.1 to 1.

The two components are typically produced separately from one another and, at least for the second component, with the exclusion of moisture. The components are typically stored each in a separate container. The additional constituents of the polyurethane adhesive can be present as a constituent of the first or of the second component, wherein additional constituents that are reactive with isocyanate groups are preferably a constituent of the first component. A suitable container for storing the respective component is represented, in particular, by a drum, a hobbock, a pouch, a bucket, a can, a cartridge or a tube.

Before use, the two components are stored separately from one another and are mixed with one another only at the time of use or immediately before use. The components are advantageously provided in a package which consists of two mutually separated chambers.

In a further aspect, the invention comprises a package consisting of a packaging with two mutually separated chambers, each chamber containing one of the two components of the polyurethane adhesive.

Preferred packages of this type are, on the one hand, side-by-side double cartridges or coaxial cartridges in which two tubular chambers are arranged next to one another or one inside the other and closed with pistons in an air and moisture tight manner. By propelling these pistons, the components can be pressed out of the cartridge. The sides of the tube facing the pistons are modified, possibly via an adapter, such that the chamber openings in the area of the opening are directly connected to one another via a separation wall. Advantageously, in the area of the outlet opening of the chambers, a thread is applied, so that a static mixer or a dynamic mixer can be attached tightly. Such packages are preferable in particular for small applications, in particular for filling quantities of up to 1 liter.

For uses in larger quantities, in particular for uses in industrial manufacturing, the two components are advantageously filled and stored in drums or hobbocks. During use, the components are pressed out via feed pumps and added by metering via lines of a mixing apparatus as is used conventionally for two-component adhesives in industrial manufacturing.

The mixing is typically carried out by means of static mixers or using dynamic mixers. During the mixing, one must ensure that the two components are mixed as homogeneously as possible. If the two components are poorly mixed, local deviations from the advantageous mixing ratio occur, which can have the effect of worsening the mechanical properties. In order to be able to control the mixing quality visually, it can be advantageous for the two components to have two different colors. Mixing is considered good if the mixed adhesive has a homogeneous mixed color, without visible stripes or streaks.

When the first component comes into contact with isocyanate groups of the second component, curing starts by chemical reaction. In the process, the amino groups of the polyamine A3 and the hydroxyl groups of the triol A1 and of the diol A2, and any other optionally present substances that are reactive with isocyanate groups, react with isocyanate groups that are present. Excess isocyanate groups react with moisture that is present. As a result of these reactions, the polyurethane adhesive cures to form a solid material. This process is also referred to as crosslinking.

Another subject matter of the invention is thus also a cured polyurethane adhesive, obtained from the curing of a polyurethane adhesive as described in the present document.

A further aspect of the present invention relates to a method for bonding a first substrate to a second substrate, which comprises the steps of:
mixing the two above-described components,
applying the mixed polyurethane adhesive to at least one of the substrate surfaces to be bonded,
joining the substrates to be bonded within the open time,
curing the polyurethane adhesive.

Here, the two substrates can consist of the same or different materials.

In this method, suitable substrates are in particular glass, glass ceramics;
metals and alloys, such as aluminum, iron, steel and nonferrous metals, as well as surface-finished metals and alloys, such as zinc-coated or chromium-coated metals,
coated and lacquered substrates, such as powder-coated metals or alloys and lacquered metal sheets;
plastics such as polyvinyl chloride (hard and soft PVC), acrylonitrile-butadiene-styrene copolymers (ABS), polycarbonate (PC), polyamide (PA), polyesters, poly (methyl methacrylate) (PMMA), polyesters, epoxide resins, polyurethanes (PUR), polyoxymethylene (POM), polyolefins (PO), polyethylene (PE) or polypropylene (PP), ethylene/propylene copolymers (EPM) and ethylene/propylene/diene terpolymers (EPDM), wherein the plastics can be surface-treated preferably by means of plasma, corona or flames;
fiber reinforced plastics, such as carbon fiber reinforced plastics (CFP), glass fiber reinforced plastics (GFP) and sheet molding compounds (SMC);
wood, with resins; for example, phenol, melamine or epoxy resins, bound wood materials, resin-textile composite materials and additional so-called polymer composites; as well as
concrete, mortar, brick, tile, plaster and natural rock such as granite or marble.

In this method, one or both substrates is/are preferably a metal or a ceramic or a glass fiber reinforced plastic or a carbon fiber reinforced plastic.

If needed, the substrates can be pretreated before the application of the adhesive. Such pretreatments include in particular physical and/or chemical cleaning methods, as well as the application of an adhesive promoter, an adhesive promoter solution or a primer.

From this described method for bonding, an item is formed in which the adhesive establishes a non-positive connection of the two substrates to one another.

This item is in particular a structure, for example, a bridge, an industrial product or a consumer product, in particular, a window, a rotor blade, a wind turbine or a transport means, in particular, a vehicle, preferably a motor vehicle, a bus, a truck, a train or a ship, as well as an airplane or a helicopter, or an add-on part of such an item.

An additional subject matter of the invention is an item obtained from the above described method for bonding.

The described polyurethane adhesive has very good properties as a structural adhesive.

Here, the term structural adhesive is used to denote an adhesive which in the cured state forms a portion of the bearing structure of the bonded components. The structural adhesive is thus an important binding element of the construction within which it links two components or substrates. Correspondingly stringent requirements are placed on its mechanical properties.

At room temperature, a cured structural adhesive preferably has a tensile strength of more than 5 MPa, particularly preferably more than 8 MPa, in particular more than 10 MPa.

At room temperature, the cured structural adhesive preferably has an elongation at rupture of more than 100%, in particular more than 150%.

At room temperature, the cured structural adhesive preferably has an elasticity modulus in the range of at least 20 MPa, particularly preferably at least 25 MPa, in particular at least 30 MPa.

The cured structural adhesive preferably has a glass transition temperature below −35° C., preferably below −37° C., in particular below −40° C.

These mentioned values are measured as described in the following examples.

An additional important property of a structural adhesive is its good processability. Here the two components, individually and at the time of mixing, should have a low viscosity so that they can be conveyed and mixed satisfactorily, but can then very rapidly build up a viscosity such that a pseudoplastic, stable material is obtained directly, so that layer thicknesses of up to 10 millimeters and more can be applied.

These requirements can be met particularly well with the described polyurethane adhesive. The presence of the special catalyst K during the curing in particular makes it possible to achieve particularly good mechanical properties at cold temperatures, as a result of its effect of lowering the glass transition temperature.

EXAMPLES

Below, embodiment examples are indicated which are intended to further explain the described invention. Naturally, the invention is not limited to these described embodiment examples.

1. Substances Used:

| | |
|---|---|
| Poly-isocy-anate | modified diphenylmethane diisocyanate containing MDI-carbodiimide adducts, liquid at room temperature, NCO content 29.4% by weight (Isonate ® M 143 from Dow) |
| Triol | EO end-capped polyoxypropylene triol, OH number 34.7 mg KOH/g (Voranol ® CP 4755 from Dow) |
| MXDA | 1,3-Bis(aminomethyl)benzene |
| BAC | 1,3-Bis(aminomethyl)cyclohexane |
| Polyether triamine | Polyoxypropylenetriamine, amine number 346.3 mg KOH/g (Jeffamine ® T-403 from Huntsman) |
| Polyether diamine | Polyoxypropylenediamine, amine number 467.5 mg KOH/g (Jeffamine ® D-230 from Huntsman) |
| Silicic acid | pyrogenic silicic acid, hydrophobically modified |
| Zr-Ch1 | Zirconium chelate complex in reactive diluent and tert-butyl-acetate, zirconium content 3.5% by weight (K-Kat ® A-209 from King Industries) |
| Zr-Ch2 | Zirconium(IV) tetrakis(1,3-diphenylpropane-1,3-dionate) in tetraethylene glycol dimethyl ether/acetylacetone, zirconium content 1.8% by weight |
| Fe-Ch1 | Iron(III) tris(N,N-diethyl-3-oxobutane amidate), iron content 6.5% by weight |
| Ti-Ch1 | Titanium(IV) bis(ethylacetoacetato) diisobutylate, titanium content 9.9% by weight (Tyzor ® IBAY from Du Pont/Dorf Ketal) |
| DABCO | 1,4-Diazabicyclo[2.2.2]octane, 33.0% by weight in dipropylene glycol (DABCO 33 LV ® from Air Products) |
| DBTDL | Dibutyltin dilaurate in diisodecyl phthalate, tin content 1.9% by weight (from Sigma-Aldrich) |
| Sn-1 | Tin(II) 2-ethylhexanoate, tin content 28.0% by weight (from Sigma-Aldrich) |
| Bi-Ch1 | Bismuth(III) neodecanoate oxinate in neodecanoic acid/diisodecyl phthalate, bismuth content 5.8% by weight |
| Bi-Ch2 | Bismuth(III) tris(N,N-diethyl-3-oxobutane amidate) in neodecanoic acid, bismuth content 9.3% by weight |
| Zn-1 | Zinc(II) neodecanoate, zinc content 18% by weight (from Alpha Aesar) |
| Zr-3 | Zirconium(IV) neodecanoate, zirconium content 12.1% by weight (BiCAT ® 4130 from Shepherd) |
| Fe-2 | Iron(III) 2-ethylhexanoate, iron content 6% by weight (from AMSPEC) |
| Ti-2 | Titanium(IV)-tetra-n-butylate, titanium content 14.1% by weight (from Sigma Aldrich) |

Zr-Ch2 was produced by mixing 9.36 g zirconium(IV) tetrakis(isopropoxide) 70% by weight in isopropanol and 17.94 g 1,3-diphenyl-1,3-propanedione, stirring for 2 hours at 25° C., subsequently removing the volatile components in a vacuum, and finally dissolving the solid that is obtained in a mixture of 40 g tetraethylene glycol dimethyl ether and 40 g acetylacetone.

Fe-Ch1 was produced by mixing 4.4 g dried Fe(III) tris(acetylacetonate) and 9.3 g N,N-diethyl-3-oxobutanamide, heating under stirring for 3 hours at 90° C., then removing the volatile components in a vacuum, and finally cooling.

Bi-Ch1 was produced by mixing 1.25 g Coscat® 83 (bismuth(III) tris(neodecanoate) in neodecanoic acid, bismuth content 16.0% by weight, from Erbslöh) and a solution of 0.44 g 8-hydroxyquinoline in 3.27 diisodecyl phthalate, heating under stirring for 2 hours at 80° C., and subsequently cooling.

Bi-Ch2 was produced by mixing 7.75 g Coscat® 83 (bismuth(III) tris(neodecanoate) in neodecanoic acid, bismuth content 16.0% by weight, from Erbslöh) and 2.85 g N,N-diethyl-3-oxobutanamide, heating under stirring for 2 hours at 80° C., and subsequently cooling.

Polymer-1 was produced by reacting 1300 g polyoxypropylene diol (Acclaim® 4200 N from Bayer; OH number 28.5 mg KOH/g), 2600 g polyoxypropylene polyoxyethylene trial (Caradol® MD34-02 from Shell; OH number 35.0 mg KOH/g), 600 g 4,4'-methylene diphenyl diisocyanate (Desmodur® 44 MC L from Bayer) and 500 g diisodecyl phthalate using known methods at 80° C. to form an NCO end-capped polyurethane polymer with a content of free isocyanate groups of 2.05% by weight.

2. Preparation of Polyurethane Adhesives

For each adhesive, the ingredients indicated in Tables 1 to 4 were processed in the indicated quantities (in parts by weight) of the first component ("component 1") by means of a centrifugal mixer (SpeedMixer™ DAC 150, FlackTek Inc.) with exclusion of moisture to form a homogeneous paste and were stored. In the same manner, the ingredients indicated in Tables 1 to 4 of the second component ("component 2") were processed and stored. Subsequently, the two components were processed by means of the centrifugal mixture with exclusion of moisture to form a homogeneous paste and said paste was immediately checked as follows:

As a measure of the open time, the "tack-free time" was determined. For this purpose, several grams of the adhesive were applied in a layer thickness of approximately 2 mm on cardboard and, under standard atmospheric conditions, the time until the first time that no residues remained on the pipette after slightly tapping the surface of the adhesive with a pipette made of LDPE was determined.

For the determination of the mechanical properties, the adhesive was pressed onto a PTFE-coated foil to form a film having a thickness of 2 mm, which was stored for 7 days under standard atmospheric conditions; several dumbbell shaped samples having a length of 75 mm, with a bar length of 30 mm and a bar width of 4 mm, were punched from the film, and these dumbbell shaped samples were tested according to DIN EN 53504 at a traction rate of 200 mm/min to determine the tensile strength (force at break), elongation at rupture and E modulus (at 0.5-50% elongation). The values for E modulus and tensile strength were used as a measure of the strength of the composition.

For the determination of the glass transition temperature ($T_g$), the adhesive was pressed onto a PTFE-coated film to form a film having a thickness of 2 mm; this film was stored far 7 days under standard atmospheric conditions; a disk-shaped sample having a diameter of 10 mm was punched out and using a Mettler DMA/SDTA 861e the $T_g$ was determined (DMTA method, measurement in shear mode, 10 Hz excitation frequency, heating rate 5 K/min). The sample was cooled in the process to −60° C. and, with a determination of storage modulus G' [MPa] and loss modulus G" [MPa], heated at 200° C. The Tg was read at the maximum value of the quotient G"/G'.

The results are indicated in Tables 1 to 4.

Adhesives Z-1 to Z-15 are examples according to the invention; the adhesives Ref-1 to Ref-18 are comparison examples.

The adhesives Z-1, Z-2, Z-3 and Z-4 were applied 1 minute after the end of the mixing time of the two components to a small plate made of glass fiber reinforced plastic which had been degreased with isopropanol beforehand, and were then covered and pressed with a second identical small plate, so that an overlapping adhesive area of 15×45 mm with a layer thickness of 2 mm was formed, they were cured for 24 h at 23° C. and subsequently for 3 h at 80° C., and after a conditioning time of 24 h at 23° C., the tensile shear strength according to DIN EN 1465 was determined, wherein, in each case, a cohesive rupture pattern resulted.

In the same manner, using the adhesives Z-1, Z-2, Z-3 and Z-4, in each case two small plates made of carbon fiber reinforced plastic were bonded, and the tensile shear strength was determined, wherein, in each case, a cohesive rupture pattern resulted.

The comparison adhesives Ref-12 and Ref-13 were liquid immediately after the mixing of the two components, while the remaining adhesives, immediately after mixing, presented a good stability.

The cured films Ref-3 and Ref-6 had many bubbles. The remaining cured films were either free of bubbles or had only a few fine bubbles.

TABLE 1

Composition (in parts by weight) and properties of Z-1 to Z-5 and Ref-1 to Ref-9

| | Adhesive | | | | | | |
|---|---|---|---|---|---|---|---|
| | Z-1 | Z-2 | Z-3 | Z-4 | Z-5 | Ref-1 | Ref-2 |
| Component 1: | | | | | | | |
| Triol | 50.50 | 50.50 | 50.50 | 50.50 | 50.50 | 50.50 | 50.50 |
| 1,4-Butanediol | 8.10 | 8.10 | 8.10 | 8.10 | 8.10 | 8.10 | 8.10 |
| Catalyst(s) | Zr—Ch1, 0.24 | Zr—Ch2, 0.38 | Fe—Ch1, 0.04 | Ti—Ch1, 0.40 | Zr—Ch1, 0.12 DABCO, 0.12 | DABCO, 0.24 | DBTDL, 0.32 |
| MXDA | 2.00 | 2.00 | 2.00 | 2.00 | 2.00 | 2.00 | 2.00 |
| Molecular sieve | 4.00 | 4.00 | 4.00 | 4.00 | 4.00 | 4.00 | 4.00 |
| Calcined kaolin | 35.40 | 35.40 | 35.40 | 35.40 | 35.40 | 35.40 | 35.40 |
| Component 2: | | | | | | | |
| Polyisocyanate | 34.27 | 34.27 | 34.27 | 34.27 | 34.27 | 34.27 | 34.27 |
| Polymer 1 | 49.02 | 49.02 | 49.02 | 49.02 | 49.02 | 49.02 | 49.02 |
| Silicic acid | 3.47 | 3.47 | 3.47 | 3.47 | 3.47 | 3.47 | 3.47 |
| tack-free time [min] | 7 | 8 | 9 | 5 | 11 | 8 | 16 |
| Tensile strength [MPa] | 10.7 | 10.4 | 11.3 | 10.0 | 11.4 | 11.3 | 10.5 |
| Elongation at rupture [%] | 238 | 243 | 251 | 261 | 207 | 226 | 248 |
| E mod. 0.5-5% [MPa] | 39.1 | 38.6 | 37.6 | 36.2 | 28.2 | 33.9 | 34.1 |
| $T_g$ [° C.] | −42.0 | −41.8 | −40.2 | −42.8 | −39.5 | −36.1 | −38.6 |
| Ratio V1 | 6.7 | 6.7 | 6.7 | 6.7 | 6.7 | 6.7 | 6.7 |
| Ratio V2 | 6.1 | 6.1 | 6.1 | 6.1 | 6.1 | 6.1 | 6.1 |

| | Adhesive | | | | | | |
|---|---|---|---|---|---|---|---|
| | Ref-3 | Ref-4 | Ref-5 | Ref-6 | Ref-7 | Ref-8 | Ref-9 |
| Component 1: | | | | | | | |
| Triol | 50.50 | 50.50 | 50.50 | 50.50 | 50.50 | 50.50 | 50.50 |
| 1,4-Butanediol | 8.10 | 8.10 | 8.10 | 8.10 | 8.10 | 8.10 | 8.10 |
| Catalyst | Sn-1, 0.16 | Bi—Ch1, 0.20 | Bi—Ch2, 0.14 | Zn-1, 0.80 | Zr-3, 0.90 | Fe-2, 0.61 | Ti-2, 1.40 |
| MXDA | 2.00 | 2.00 | 2.00 | 2.00 | 2.00 | 2.00 | 2.00 |
| Molecular sieve | 4.00 | 4.00 | 4.00 | 4.00 | 4.00 | 4.00 | 4.00 |
| Calcined kaolin | 35.40 | 35.40 | 35.40 | 35.40 | 35.40 | 35.40 | 35.40 |
| Component 2: | | | | | | | |
| Polyisocyanate | 34.27 | 34.27 | 34.27 | 34.27 | 34.27 | 34.27 | 34.27 |
| Polymer 1 | 49.02 | 49.02 | 49.02 | 49.02 | 49.02 | 49.02 | 49.02 |
| Silicic acid | 3.47 | 3.47 | 3.47 | 3.47 | 3.47 | 3.47 | 3.47 |
| tack-free time [min] | 10 | 14 | 10 | 17 | 8 | 7 | 14 |
| Tensile strength [MPa] | 7.8 | 11.6 | 10.4 | 10.2 | 10.5 | 10.3 | 7.8 |
| Elongation at rupture [%] | 177 | 240 | 210 | 195 | 205 | 179 | 221 |
| E. mod. 0.5-5% [MPa] | 21.6 | 34.6 | 31.4 | 31.7 | 27.7 | 28.7 | 22.6 |
| $T_g$ [° C.] | −32.4 | −36.6 | −36.6 | −35.5 | −34.3 | −37.4 | −37.9 |
| Ratio V1 | 6.7 | 6.7 | 6.7 | 6.7 | 6.7 | 6.7 | 6.7 |
| Ratio V2 | 6.1 | 6.1 | 6.1 | 6.1 | 6.1 | 6.1 | 6.1 |

TABLE 2

Composition (in parts by weight) and properties of Z-6 to Z-7 and Ref-10 to Ref-11

| Adhesive | Z-6 | Ref-10 | Z-7 | Ref-11 |
|---|---|---|---|---|
| Component 1: | | | | |
| Triol | 50.50 | 50.50 | 50.50 | 50.50 |
| 1,4-Butanediol | 6.40 | 6.40 | 5.10 | 5.10 |
| Catalyst | Zr-Ch1, 0.25 | DABCO, 0.24 | Zr-Ch1, 0.25 | DABCO, 0.24 |
| MXDA | 1.87 | 1.87 | 2.00 | 2.00 |
| Molecular sieve | 4.00 | 4.00 | 4.00 | 4.00 |
| Calcined kaolin | 35.40 | 35.40 | 35.40 | 35.40 |
| Component 2: | | | | |
| Polyisocyanate | 28.66 | 28.66 | 24.81 | 24.81 |
| Polymer 1 | 40.99 | 40.99 | 35.49 | 35.49 |
| Silicic acid | 2.90 | 2.90 | 2.51 | 2.51 |
| tack-free time [min] | 5 | 7 | 6 | 6 |
| Tensile strength [MPa] | 10.6 | 9.6 | 10.0 | 9.5 |
| Elongation at rupture [%] | 282 | 208 | 248 | 205 |
| E. mod. 0.5-5% [MPa] | 29.5 | 23.6 | 24.7 | 19.3 |
| $T_g$ [° C.] | −39.2 | −32.1 | −37.4 | −33.2 |
| Ratio V1 | 5.4 | 5.4 | 4.6 | 4.6 |
| Ratio V2 | 5.2 | 5.2 | 3.9 | 3.9 |

TABLE 3

Composition (in parts by weight) and properties of Z-8 and Z-9 and Ref-12 to Ref-15

| Adhesive | Z-8 | Ref-12 | Z-9 | Ref-13 | Ref-14 | Ref-15 |
|---|---|---|---|---|---|---|
| Component 1: | | | | | | |
| Triol | 50.50 | 50.50 | 50.50 | 50.50 | 50.50 | 50.50 |
| 1,3-Propanediol | 6.82 | 6.82 | — | — | — | — |
| 1,5-Pentanediol | — | — | 9.47 | 9.47 | — | — |
| 1,3-Butanediol | — | — | — | — | 8.10 | 8.10 |
| Catalyst | Zr—Ch1, 0.29 | DABCO, 0.24 | Zr—Ch1, 0.24 | DABCO, 0.24 | Zr—Ch1, 0.24 | DABCO, 0.24 |
| MXDA | 2.00 | 2.00 | 2.00 | 2.00 | 2.00 | 2.00 |
| Molecular sieve | 4.00 | 4.00 | 4.00 | 4.00 | 4.00 | 4.00 |
| Calcined kaolin | 35.40 | 35.40 | 35.40 | 35.40 | 35.40 | 35.40 |
| Component 2: | | | | | | |
| Polyisocyanate | 34.27 | 34.27 | 34.27 | 34.27 | 34.27 | 34.27 |
| Polymer 1 | 49.02 | 49.02 | 49.02 | 49.02 | 49.02 | 49.02 |
| Silicic acid | 3.47 | 3.47 | 3.47 | 3.47 | 3.47 | 3.47 |
| tack-free time [min] | 9 | 5 | 3 | 5 | 35 | 23 |
| Tensile strength [MPa] | 7.1 | 9.7 | 10.1 | 10.2 | 6.6 | 5.5 |
| Elongation at rupture [%] | 193 | 213 | 302 | 223 | 402 | 214 |
| E. Mod. 0.5-5% [MPa] | 34.0 | 29.5 | 473 | 32.3 | 4.9 | 6.5 |
| $T_g$ [° C.] | −41.9 | −37.6 | −43.6 | −32.7 | +0.2 | +0.6 |
| Ratio V1 | 6.7 | 6.7 | 6.7 | 6.7 | — | — |
| Ratio V2 | 6.1 | 6.1 | 6.1 | 6.1 | — | — |

TABLE 4

Composition (in parts by weight) and properties of Z-12 to Z-15 and Ref-16 to Ref-17

| Adhesive | Z-12 | Ref-16 | Z-13 | Ref-17 | Z-14 | Z-15 |
|---|---|---|---|---|---|---|
| Component 1: | | | | | | |
| Triol | 50.50 | 50.50 | 50.50 | 50.50 | 50.50 | 50.50 |
| 1,4-Butanediol | 8.10 | 8.10 | 8.10 | 8.10 | 8.10 | 8.10 |
| Catalyst | Zr—Ch1, 0.24 | DABCO, 0.24 | Zr—Ch1, 0.25 | DABCO, 0.24 | Zr—Ch2, 0.20 | Zr—Ch2, 0.27 |
| BAC | 2.00 | 2.00 | — | — | — | — |
| Polyether triamine | — | — | 2.00 | 2.00 | — | — |
| Polyether diamine | — | — | — | — | 3.00 | 5.00 |
| Molecular sieve | 4.00 | 4.00 | 4.00 | 4.00 | 4.00 | 4.00 |
| Calcined kaolin | 35.40 | 35.40 | 35.40 | 35.40 | 35.40 | 35.40 |
| Component 2: | | | | | | |
| Polyisocyanate | 34.07 | 34.07 | 31.88 | 31.88 | 31.76 | 33.49 |
| Polymer 1 | 48.73 | 48.73 | 45.61 | 45.61 | 45.43 | 47.91 |

TABLE 4-continued

Composition (in parts by weight) and properties of Z-12 to Z-15 and Ref-16 to Ref-17

|  | Adhesive | | | | | |
| --- | --- | --- | --- | --- | --- | --- |
|  | Z-12 | Ref-16 | Z-13 | Ref-17 | Z-14 | Z-15 |
| Silicic acid | 3.45 | 3.45 | 3.23 | 3.23 | 3.22 | 3.39 |
| tack-free time [min] | 13 | 11 | 7 | 11 | 34 | 26 |
| Tensile strength [MPa] | 8.8 | 9.5 | 8.8 | 8.0 | 5.9 | 6.8 |
| Elongation at rupture [%] | 198 | 206 | 169 | 164 | 168 | 202 |
| E. Mod. 0.5-5% [MPa] | 30.5 | 23.5 | 31.2 | 20.3 | 22.9 | 22.5 |
| $T_g$ [° C.] | −39.2 | −34.5 | −37.5 | −33.7 | −41.3 | −40.3 |
| Ratio V1 | 6.7 | 6.7 | 6.2 | 6.2 | 6.6 | 7.1 |
| Ratio V2 | 6.4 | 6.4 | 14.6 | 14.6 | 7.2 | 4.3 |

The invention claimed is:

1. Polyurethane adhesive consisting of a first and a second component, wherein
the first component contains
a) at least one triol A1 with a molecular weight in the range from 1000 to 10,000 g/mol,
b) at least one diol A2 with two primary hydroxyl groups and a molecular weight in the range from 60 to 150 g/mol, and
c) at least one aliphatic polyamine A3 with a molecular weight in the range from 60 to 500 g/mol;
the second component contains
d) at least one polyisocyanate B1 and
e) at least one polyurethane polymer B2 having isocyanate groups;
and the polyurethane adhesive moreover contains
f) at least one catalyst K in the form of a metal-chelate complex, wherein the metal is selected from the group consisting of Fe(III), Ti(IV), Zr(IV) and Hf(IV);
wherein the triol A1, the diol A2 and the polyamine A3 are present in such a quantity that
g) the ratio V1 of the number of OH groups and the number of NH$_2$ groups of (A2+A3)/A1 is in the range from 3 to 15, and
h) the ratio V2 of the number of OH groups and the number of NH$_2$ groups of A2/A3 is in the range from 2 to 30; wherein the polyurethane adhesive after being cured has a glass transition temperature below −40° C., the glass transition temperature being determined via dynamic mechanical thermoanalysis (DMTA).

2. Polyurethane adhesive according to claim 1, wherein the triol is a polyether triol.

3. Polyurethane adhesive according to claim 1, wherein the triol comprises primary hydroxyl groups.

4. Polyurethane adhesive according to claim 1, wherein the diol is selected from the group consisting of 1,3-propanediol, 1,4-butanediol and 1,5-pentanediol.

5. Polyurethane adhesive according to claim 1, wherein the polyamine is selected from the group consisting of 1,5-diamino-2-methylpentane, 2,2,4- and 2,4,4-trimethylhexamethylenediamine, 1,8-octanediamine, 1,10-decanediamine, 1,12-dodecanediamine, 1-amino-3-aminomethyl-3,5,5-trimethylcyclohexane, 2- and 4-methyl-1,3-diaminocyclohexane and mixtures thereof, 1,3-bis(aminomethyl)cyclohexane, 1,4-bis(aminomethyl)cyclohexane, 2,5(2,6)-bis(aminomethyl)bicyclo[2.2.1]heptane, 3(4),8(9)-bis(aminomethyl)tricyclo[5.2.1.0$^{2,6}$]decane, bis(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 1,3-bis(aminomethyl)benzene and 1,4-bis(aminomethyl)benzene.

6. Polyurethane adhesive according to claim 1, wherein the ratio V1 is in the range from 4 to 10.

7. Polyurethane adhesive according to claim 1, wherein the ratio V2 is in the range from 4.5 to 15.

8. Polyurethane adhesive according to claim 1, wherein the polyisocyanate B1 is a form of 4,4'-, 2,4'- and 2,2'-diphenylmethane diisocyanate which is liquid at room temperature and any mixtures of these isomers (MDI) in the form of polymeric MDI or MDI with contents of oligomers or derivatives.

9. Polyurethane adhesive according to claim 1, wherein the polyurethane polymer B2 comprises 50-95% by weight polyoxyalkylene units.

10. Polyurethane adhesive according to claim 1, wherein the polyurethane polymer B2 comprises urethane groups and free isocyanate groups, which are derived from 4,4'-diphenylmethane diisocyanate.

11. Polyurethane adhesive according to claim 1, wherein the catalyst K comprises at least one chelate ligand selected from the group consisting of 1,3-diketonate, 1,3-ketoesterate and 1,3-ketoamidate.

12. Polyurethane adhesive according to claim 1, wherein the catalyst K is selected from the group consisting of iron(III) tris(acetylacetonate), iron(III) tris(ethylacetoacetate), iron(III) tris(tert-butylacetoacetate), iron(III) tris(N,N-diethyl-3-oxobutane amidate), titanium(IV) bis(acetylacetonato) diisopropylate, titanium(IV) bis(acetylacetonato) diisobutylate, titanium(IV) bis(acetylacetonato)-bis(2-ethylhexylate), titanium(IV) bis(ethylacetoacetato) diisopropylate, titanium(IV) bis(ethylacetoacetato) diisobutylate, titanium(IV) bis(ethylacetoacetato)-bis(2-ethylhexylate), titanium(IV) bis(tert-butylacetoacetato) diisopropylate, titanium(IV) bis(tert-butylacetoacetate) diisobutylate, titanium (IV) bis(N,N-diethyl-3-oxobutane amidato) diisopropylate, titanium(IV) bis(N,N-diethyl-3-oxobutane amidato) diisobutylate, titanium(IV) bis(N,N-diethyl-3-oxobutane amidato)-bis(2-ethylhexylate), zirconium(IV) tetrakis(acetylacetonate), zirconium(IV) tetrakis(1,3-diphenylpropane-1,3-dionate), zirconium(IV) tetrakis(ethylacetoacetate), zirconium(IV) tetrakis(tert-butylacetoacetate), zirconium(IV) tetrakis(ethyl-3-oxo-valerate), zirconium(IV) tetrakis(ethyl-3-oxo-hexanoate), zirconium(IV) tetrakis(N,N-diethyl-3-oxobutane amidate), zirconium(IV) tetrakis(N,N-dibutyl-3-oxobutane amidate), zirconium(IV) tetrakis-(N,N-dibutyl-3-oxoheptane amidate) and zirconium(IV) tetrakis(N,N-bis(2-ethylhexyl)-3-oxobutane amidate).

13. Method for bonding a first substrate to a second substrate, which comprises the steps of:
mixing the two components of the polyurethane adhesive according to claim 1,
applying the mixed polyurethane adhesive to at least one of the substrate surfaces to be bonded,
joining the substrates to be bonded within the open time, and
curing the polyurethane adhesive.

14. Method according to claim 13, wherein one or both substrates is/are a metal or a ceramic or a glass fiber reinforced plastic or carbon fiber reinforced plastic.

15. Article obtained by a method for bonding according to claim 13.

16. Polyurethane adhesive according to claim 1, wherein the glass transition temperature of the polyurethane adhesive after being cured is in a range of from −40.2° C. to −43.6° C.

17. Polyurethane adhesive according to claim 16, wherein the metal is selected from the group consisting of Fe(III), Ti(IV), and Zr(IV).

18. Polyurethane adhesive according to claim 1, wherein the metal is Fe(III).

19. Polyurethane adhesive according to claim 1, wherein the metal is Ti(IV).

20. Polyurethane adhesive according to claim 1, wherein the metal is Zr(IV).

* * * * *